United States Patent
Al Doukhi et al.

(10) Patent No.: US 10,100,510 B1
(45) Date of Patent: Oct. 16, 2018

(54) EXPANDABLE SHADE AND SHELTER SYSTEM

(71) Applicant: Imam Abdulrahman Bin Faisal University, Dammam (SA)

(72) Inventors: Fatima Al Doukhi, Al-Khobar (SA); Hala El-Wakeel, Al-Khobar (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/810,948

(22) Filed: Nov. 13, 2017

Related U.S. Application Data

(60) Provisional application No. 62/474,144, filed on Mar. 21, 2017.

(51) Int. Cl.
*E04B 1/343* (2006.01)
*E04F 10/02* (2006.01)
*E04B 1/32* (2006.01)
*E04B 1/00* (2006.01)

(52) U.S. Cl.
CPC .......... *E04B 1/34363* (2013.01); *E04F 10/02* (2013.01); *E04B 1/3205* (2013.01); *E04B 2001/0061* (2013.01); *E04B 2001/327* (2013.01)

(58) Field of Classification Search
CPC ............... E04B 1/3205; E04B 1/34363; E04B 2001/0061; E04B 2001/327; E04F 10/02
See application file for complete search history.

(56) References Cited

U.S. PATENT DOCUMENTS

| 1,169,702 | A | * | 1/1916 | Washburn | E04H 15/36 135/124 |
| 2,928,360 | A | * | 3/1960 | Heine, Jr. | E04B 7/105 135/123 |
| 2,961,802 | A | * | 11/1960 | Mongan | E04H 15/20 135/119 |
| 2,990,923 | A | * | 7/1961 | Macias-Sarria | E06B 7/08 160/89 |

(Continued)

OTHER PUBLICATIONS

Cathy Strongman, "'Swoosh' pavilion swoops into view at the AA", BDONLINE.CO.UK, http://www.bdonline.co.uk/swoosh-pavilion-swoops-into-view-at-the-aa/3116685.article, Jun. 27, 2008, 7 pages.

(Continued)

*Primary Examiner* — James M Ference
(74) *Attorney, Agent, or Firm* — Oblon, McClelland, Maier & Neustadt, L.L.P.

(57) ABSTRACT

An expandable shade and shelter system that includes an expandable grid structure of reversibly expandable cells in a two-dimensional grid configured to collapse to a rectangular cuboid with a top surface, an anchored bottom, an anchored first end, an expandable second end, and two expandable sides. The system includes a connecting device fixed at corners of the top surface and/or the expandable second end of the structure, a vertically oriented support structure having a top and bottom ends, where the expandable grid structure is configured to expand upwardly from the second end and inwardly towards the top of the vertically oriented support structure, while the anchored first end remains anchored, to connect the connecting device to the top of the vertically oriented support structure to form a three dimensional shelter.

11 Claims, 9 Drawing Sheets

(56) References Cited

U.S. PATENT DOCUMENTS

| | | | | |
|---|---|---|---|---|
| 2,999,507 A * | 9/1961 | Glass | E04H 15/06 | 135/128 |
| 3,060,949 A * | 10/1962 | Moss | E04H 15/18 | 135/115 |
| 3,143,194 A * | 8/1964 | Hart | E04B 1/32 | 428/180 |
| 3,215,153 A * | 11/1965 | Huddle | E04B 7/14 | 135/129 |
| 3,534,512 A * | 10/1970 | Ballas | E04B 1/3445 | 135/115 |
| 3,629,982 A * | 12/1971 | Ballay | E04B 1/3444 | 135/115 |
| 3,798,849 A * | 3/1974 | Biggs | E04B 1/32 | 135/97 |
| 3,854,266 A * | 12/1974 | Salas | E04B 1/34378 | 52/18 |
| 3,967,023 A * | 6/1976 | Lysek | B23Q 11/0816 | 193/35 C |
| 4,505,286 A * | 3/1985 | Madion | A01M 31/02 | 135/117 |
| 4,621,653 A * | 11/1986 | Aquino | E04H 15/003 | 135/117 |
| 4,750,508 A * | 6/1988 | Tatoian | E04H 15/003 | 135/118 |
| 5,080,123 A * | 1/1992 | Stein | E04H 15/003 | 135/114 |
| 5,163,262 A * | 11/1992 | Adams | B64G 9/00 | 52/111 |
| 5,234,727 A * | 8/1993 | Hoberman | A63H 33/16 | 428/12 |
| 5,327,927 A * | 7/1994 | Oh | E04H 15/58 | 135/115 |
| 5,331,992 A * | 7/1994 | Gremont | E04H 15/58 | 135/119 |
| 5,415,194 A * | 5/1995 | Kaye | E04H 15/003 | 135/115 |
| 5,477,876 A * | 12/1995 | Moss | E04H 15/26 | 135/100 |
| 5,622,197 A * | 4/1997 | Valaire | E04H 15/003 | 114/106 |
| 5,692,534 A * | 12/1997 | Brumfield | E04H 15/322 | 135/115 |
| 5,701,939 A * | 12/1997 | Pinto | E06B 9/26 | 160/130 |
| 5,918,614 A * | 7/1999 | Lynch | E04H 15/18 | 135/114 |
| 6,054,194 A * | 4/2000 | Kane | B60D 5/003 | 105/18 |
| 6,192,642 B1 * | 2/2001 | Colson | E04B 9/00 | 52/506.01 |
| 6,233,880 B1 * | 5/2001 | Sogame | B64G 9/00 | 52/245 |
| 6,601,598 B2 * | 8/2003 | Clee | A01G 9/16 | 135/143 |
| 6,892,744 B2 * | 5/2005 | Feldpausch | E04H 15/001 | 135/114 |
| 7,198,388 B2 * | 4/2007 | Pilby | E04B 9/00 | 362/325 |
| 7,591,108 B2 * | 9/2009 | Tuczek | E04B 7/102 | 52/80.1 |
| 7,673,642 B1 * | 3/2010 | Shires | E04H 15/36 | 135/119 |
| 7,874,304 B2 * | 1/2011 | Ostrowski | E04B 1/34378 | 135/128 |
| 8,084,117 B2 * | 12/2011 | Lalvani | B32B 3/266 | 428/135 |
| 8,171,947 B2 * | 5/2012 | Hardie | E04H 6/04 | 135/129 |
| 8,256,488 B2 * | 9/2012 | Ruggles | E04B 2/74 | 160/113 |
| 8,689,514 B1 * | 4/2014 | Sternowski | H01Q 1/288 | 52/635 |
| 8,739,474 B2 * | 6/2014 | Chang | E04B 1/34378 | 52/79.5 |
| 8,757,187 B2 * | 6/2014 | Kiefer | F16C 11/0623 | 135/117 |
| 8,789,317 B2 * | 7/2014 | Cheh | E04B 1/32 | 29/428 |
| 8,839,590 B1 * | 9/2014 | Kortman | E04B 9/34 | 160/136 |
| 8,869,464 B2 * | 10/2014 | Newland | G06F 17/10 | 52/80.1 |
| 8,978,679 B2 * | 3/2015 | Jennings | E04H 15/38 | 135/130 |
| 2004/0131801 A1 * | 7/2004 | Wong | A01K 1/033 | 428/12 |
| 2004/0261953 A1 * | 12/2004 | Hart | E04B 7/14 | 160/80 |
| 2007/0074461 A1 * | 4/2007 | Porter | A45B 23/00 | 52/73 |
| 2007/0095012 A1 * | 5/2007 | Kang | B21F 27/12 | 52/750 |
| 2009/0025767 A1 * | 1/2009 | Zheng | E04H 15/40 | 135/126 |
| 2009/0214821 A1 * | 8/2009 | Walsh | B29C 55/14 | 428/131 |
| 2012/0291364 A1 * | 11/2012 | Hovsepian | E04H 1/1205 | 52/79.5 |
| 2013/0141915 A1 * | 6/2013 | Costello | D03D 9/00 | 362/249.06 |
| 2013/0340373 A1 * | 12/2013 | Santiago Prowald | B64G 1/222 | 52/646 |

OTHER PUBLICATIONS

"Foldable canopy + honeycomb structure + arc support", PINTEREST. https://www.google.co.in/search?q=foldable+canopy+%2B+honeycomb+structure+%2B+arc+support&safe=active&tbm=isch&tbs=rimg:CRWoHCnJI2Y1ljgbdEwpji_1mfzyat_1zaEx-al8xYsH04971CJvTd3Dz8fBunLDNEU53MYtjqFa2jekwaDuHBQe2DCRioSCRt0TCmOL-Z_1Eaf60AxibCECKhIJPJq3_1NoTFqURjV-3h2uXl9oqEgnzFiwfTj3vUBGhNWbSpRCd7CoSCYm9N3cPPx8GE-TS14e1JHB1NKhlJ6csM0RTncxgRn7zbbjYxmaYqEgm2OoVraN6TBhFWOt-qb0WXcCoSCYO4cFB7YMJGEWId59fbdp27&tbo=u&sa=X&ved=0ahUKEwjU_ue1o57TAhUJuo8K-HfhoAsYQ9C8IGw&biw=1280&bih?904&dpr=1#imgrc=FagcKcmXZjWnIM:, Apr. 12, 2017, 1 page.

"AA summer pavilions", AA Design + Make, http://designandmake.aaschool.ac.uk/aa-summer-pavilions/, Apr. 12, 2017, 2 pages.

* cited by examiner

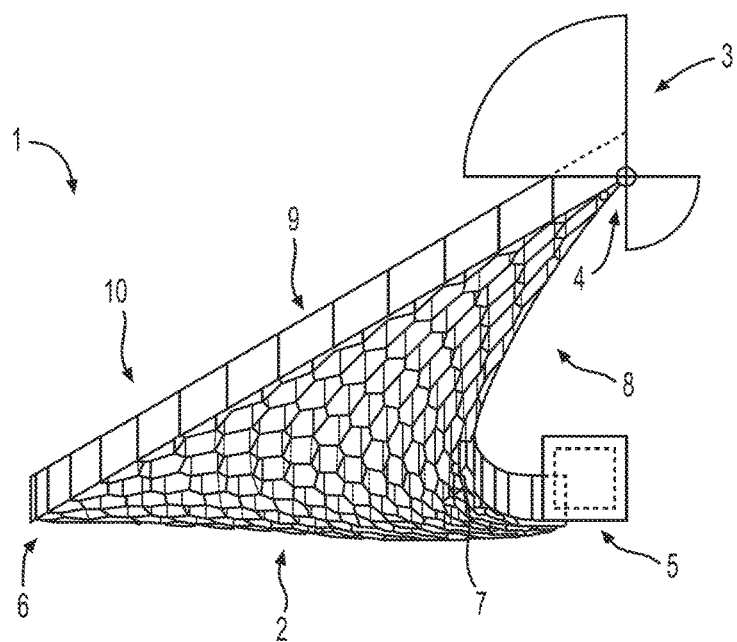
FIG. 3
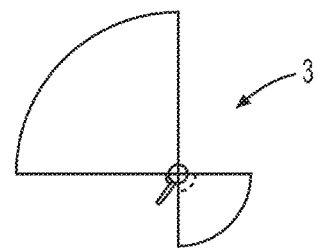
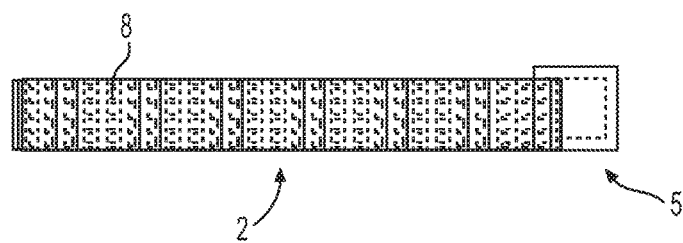
FIG. 4

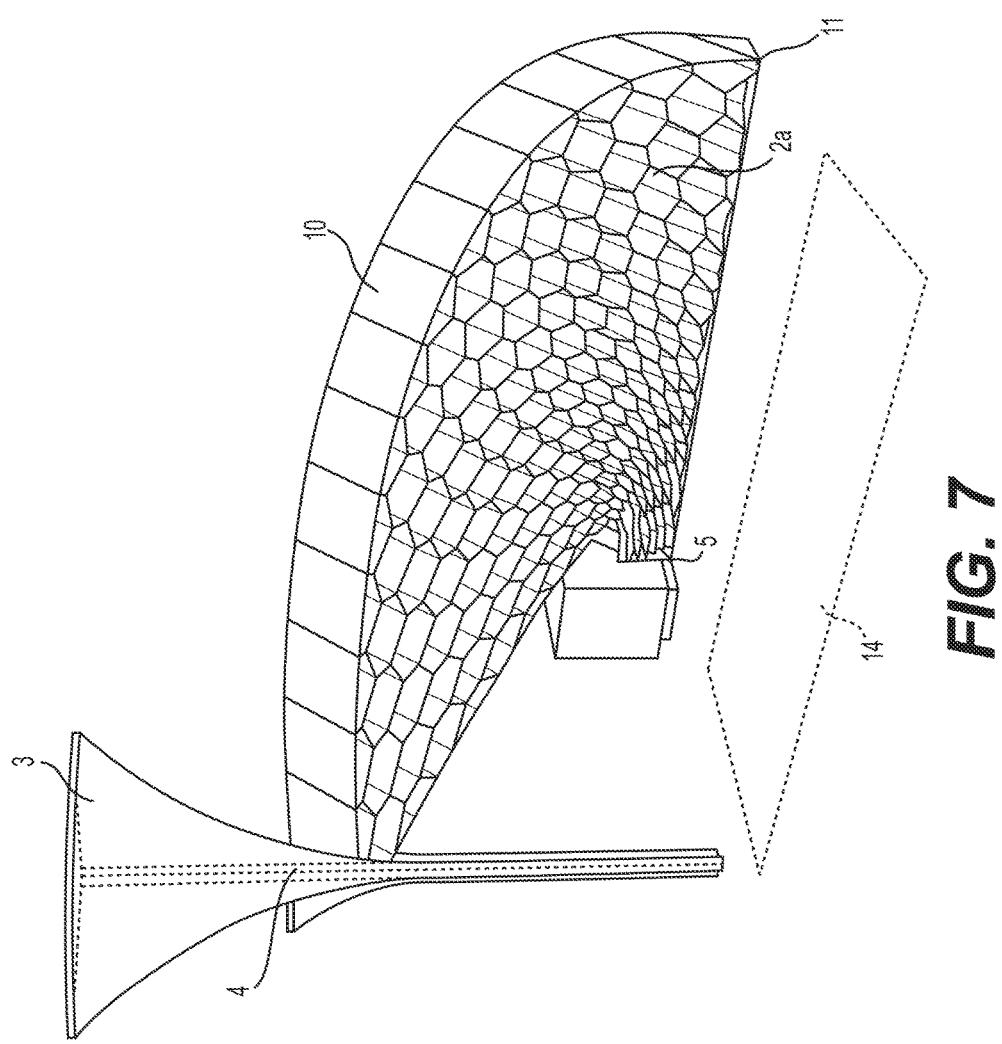

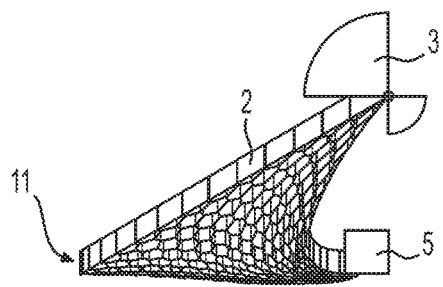
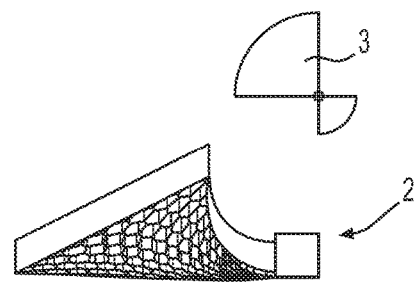
FIG. 9A        FIG. 9B
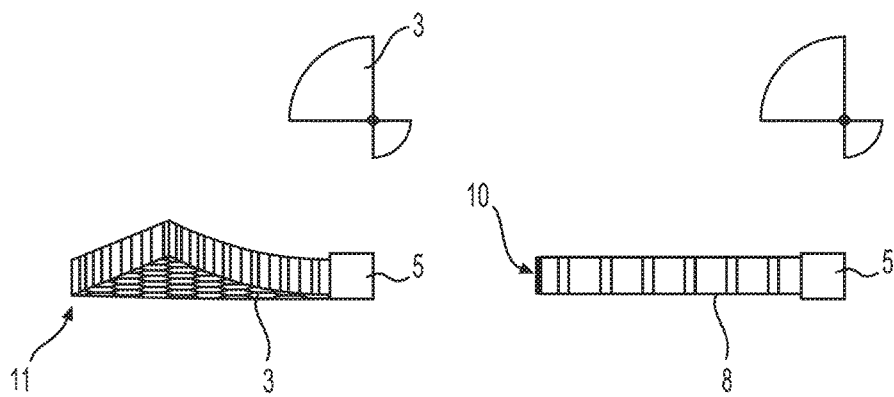
FIG. 9C        FIG. 9D

EXPANDABLE SHADE AND SHELTER SYSTEM

CROSS-REFERENCE TO RELATED APPLICATIONS

The present application claims priority to U.S. Provisional Application No. 62/474,144, having a filing date of Mar. 21, 2017, incorporated herein by reference in its entirety.

BACKGROUND OF THE INVENTION

Field of the Invention

The present disclosure relates to a shelter and shade structure that is expandable and provides shelter from the elements, such as solar rays, and which may be collapsed to form an architectural feature, and a system comprising the expandable structure.

Description of the Related Art

Throughout time humans have sought shelter from the elements by erecting permanent and/or temporary structures. Such structures serve the purpose of protecting one or more individuals from elements such as solar radiation, weather effects such as precipitation and wind, and concurrently provides privacy. Conventional permanent shelter structures are typically fixed and are not adjustable to changes in environment or weather. In order to provide complete shelter permanent structures often completely enclose a space to give full protection from the elements. Permanent structures are relatively expensive and time consuming to erect and complete. As an alternative temporary shelter structures such as tents and shading devices are often used. While some of these structures may provide some of the advantages of a permanent shelter structure, such as protection from at least a portion of the elements to which they are exposed, they may suffer from disadvantages including a lack of permanence or hardiness, or less than desirable privacy protection.

The need for temporary shelter structures is especially acute in public spaces where shelter is often sought by individuals gathering for market purposes such as market stalls and for the purposes of providing relief from the elements, such as extreme exposure to solar rays. In public spaces such permanent shelters are disfavored because they close in public spaces and often lead to a claustrophobic feel. On the other hand, temporary spaces have an unprofessional appearance and are unable to withstand the constant changes and repositioning that may be necessary in order to accommodate large crowds. Further, permanent shelters separate the individuals seeking shelter in the permanent structure from their surroundings. This point is especially critical in instances where an individual who is engaged in market activity such as a food cart, wishes to interact directly with the public.

SUMMARY OF THE INVENTION

In one aspect the present disclosure relates to an expandable shade and shelter system that provides temporary shelter such as shading on an as needed basis. The expandable shade and shelter system is expandable from a collapsed configuration to a deployed or expanded configuration which may provide shelter from the elements and privacy for one or more individuals. In a collapsed configuration the expandable shade and shelter system may act as an architectural feature in a public space such as a park bench or other ornamental feature.

In another embodiment the present disclosure includes an expandable shade and shelter system with an expandable grid structure comprising a plurality of reversibly expandable cells surrounded by a perimeter.

In another embodiment the expandable grid structure is configured to collapse to a rectangular cuboid in which the perimeter has an exposed top surface, an anchored bottom, an anchored first end, an expandable second end, and two expandable sides such that the expandable cells are disposed in a two-dimensional grid within the perimeter.

In another embodiment the present disclosure includes a connecting device fixed at one or both corners of the top surface and/or an expandable second end of an expandable grid structure, proximal to a location where the top surface joins the expandable second end.

In another embodiment the present disclosure includes a vertically oriented support structure having a top end and a bottom end, wherein the top end is configured to connect to the connecting device and the bottom end is anchored, wherein the vertically oriented support structure is disposed proximal to the anchored first end within the length of the top surface of the expandable grid structure.

In another embodiment the expandable grid structure is configured to expand upwardly from the expandable second end and inwardly towards the top end of the vertically oriented support structure, while the anchored first end remains anchored, to thereby connect the connecting device to the top end of the vertically oriented support structure to form a three dimensional shelter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a top view of one embodiment of the present disclosure in which a shade and shelter system is in a deployed or expanded configuration.

FIG. 4 shows an embodiment of the present disclosure in which a shade and shelter system is in a collapsed configuration.

FIG. 7 shows an aspect of the invention at a street level perspective showing different elements of an expandable shade and shelter system.

FIG. 9A shows a top view of shows an embodiment of the present disclosure in which an expandable shade and shelter system is in an expanded configuration in which a grid of hexagonal cells is connected to a vertically oriented support structure.

FIG. 9B shows a top view of an embodiment of the present disclosure in which an expandable shade and shelter system is in a partially collapsed form in which a connecting device has been disconnected from a vertically oriented support structure.

FIG. 9C shows an embodiment of the present disclosure in which an expandable shade and shelter system has been disconnected from a vertically oriented support structure and is in a partially collapsed form.

FIG. 9D shows a top view of an embodiment of the invention in which an expandable grid of hexagonal cells has been disconnected from a vertically oriented support structure and is in a stacked or collapsed configuration.

DETAILED DESCRIPTION OF THE PREFERRED EMBODIMENTS

Figure 1:
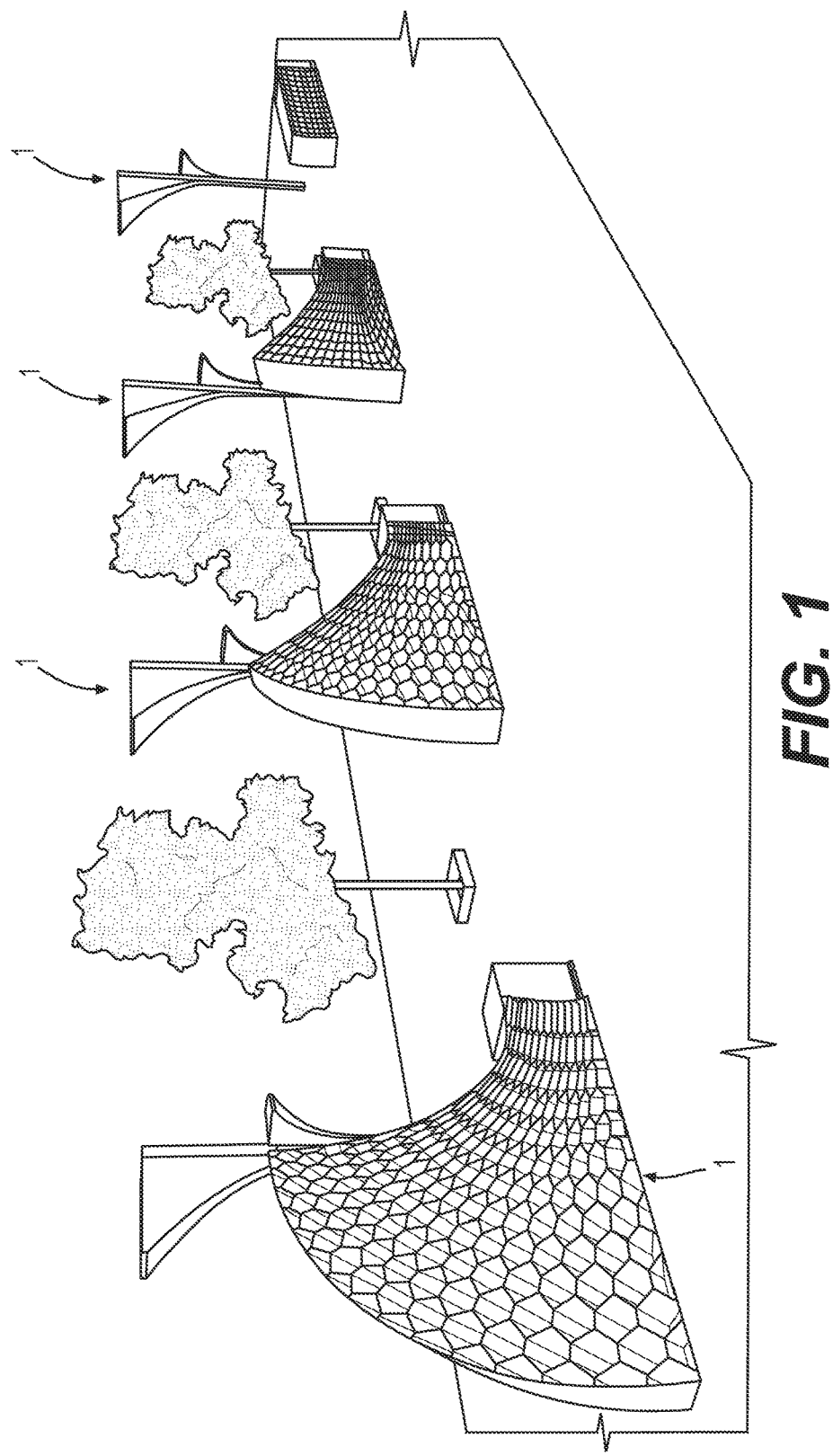
FIG. 1 shows an embodiment of the present disclosure in which a plurality of shade and shelter systems are in different states of deployment.

Aspects and embodiments of the present disclosure will now be described more fully with reference to the accompanying drawings, in which some, but not all of the embodiments of the disclosure are shown. In addition, the present disclosure will be understood with reference to the following definitions.

As used herein, the words "a" and "an" and the like carry the meaning of "one or more". With the description of this disclosure, where a numerical limit or range is stated, the end points are included unless stated otherwise. Also, all values and sub-values including subranges within a numerical limit or range are specifically included as explicitly written out.

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the disclosure. Basic and novel properties of the present disclosure include the collapsibility of an expandable structure, suitability of the expandable structure for shading and shelter, suitability of the expandable structure to provide architectural or utility functions in public spaces. The term "consisting of" describes aspects of the invention in which only those features explicitly recited in the claims are included and thus other components not explicitly or inherently included in the claim are excluded.

A preferred embodiment of the present disclosure relates to an shade and shelter system (structure) that functions to provide shade from sunlight in extreme and arid environments. Shade may be partial or full. Full shade refers to shade in which direct exposure to solar rays or sunlight is eliminated. Areas that receive full shading are not exposed to direct sunlight or solar rays but still remain illuminated from dispersed and refracted light from sources other than direct sunlight or solar rays. Partial shading refers to less than complete elimination of direct exposure to sunlight or solar rays. Partial shading may be homogeneous or broken. Homogeneous partial shade is shade which is obtained by partially blocking direct sunlight or solar rays with a material that is only partially absorbent to sunlight or solar rays. For example, a material such as glass may permit the passage of certain portions of the visible spectrum that comprise sunlight but block other portions of the electromagnetic spectrum such as infrared light. Alternately, transparent but partially dyed or filled materials can be used to block less than 100% of sunlight or solar rays of particular wavelength range.

Broken shade refers to shade which comprises both shaded and non-shaded areas. For example, an area that is 100% shaded (e.g., fully shaded from direct sunlight) may be partially shaded if one or more sections of the shaded area is exposed to direct sunlight or solar rays. Patterns of direct exposure of solar rays or sunlight may change the amount of direct or full shading in a particular area from 100% to 95%, 90%, 80%, 70%, 60%, 50%, 40%, 30%, 20%, 10% or 5%. Moreover, the areas of shading in a broken shaded area may be fully shaded areas or homogeneously partially shaded areas.

In another embodiment of the invention the shaded area which is sheltered or protected by the expandable shade and shelter system of the present disclosure may change according to the position of the sun. For example, during particular hours of the day the shaded area provided by the shade and shelter system may be at a maximum or minimum. As the position of the sun changes, depending on the orientation and degree of deployment or expansion of the expandable shade and shelter system, the total area which is shaded from direct sunlight or solar rays may be affected.

In a preferred embodiment of the invention the expandable shade and shelter system includes both an expandable shading portion and a vertically oriented support structure. The vertically oriented support structure may include one or more architectural features or utility functions. For example, the vertically oriented support structure may function to provide display space for advertising or public announcements. The vertically oriented support structure may also serve a decorative purpose and blend in with other architectural features of a public space or the architecture of buildings or features in the area of the expandable shading and shelter structure system. Utility features may include functions, such as, lighting, public announcement, water supply or other utility feature that is desirable to be present in public gathering spaces. In a preferred embodiment the vertically orientated support structure includes an electrical utility outlet or source so that individuals seeking shade in the shade and shelter system have easy access to electricity. The electricity may further be used to provide energy for lighting system, public announcement systems or display systems that are connected to or otherwise dependent on the vertically oriented support structure.

In a preferred embodiment of the invention the expandable shade and shelter system includes an expandable grid of cells that is collapsible to form a useful public architectural feature. For example, the shading structure may be collapsed to form a portion of a wall or a bench or other public sitting area. The bench may be of desirable height for sitting or for conducting business. Other architectural features may be directly connected to the expandable shade portion of the expandable shade and shelter system. Such additional components may include tables or anchoring systems which are tied directly to one or more utility systems for the supply of water, electricity or industrial gases.

FIG. 1 shows an embodiment of the invention in which a plurality of expandable shade and shelter system 1 are in various stages of expansion or collapsing. The expandable shade and shelter systems are located in a public setting with architectural features such as pavement and open public space and/or together with environmental features such as trees. The expandable shade and shelter systems are optionally designed to blend in well with environmental features such that portions thereof resemble environmental features. Further, the expandable shade and shelter systems, when in a collapsed or fully retracted form, can separately provide architectural or utility functions such as seating space, lighting or public announcement functionality.

Figure 2:
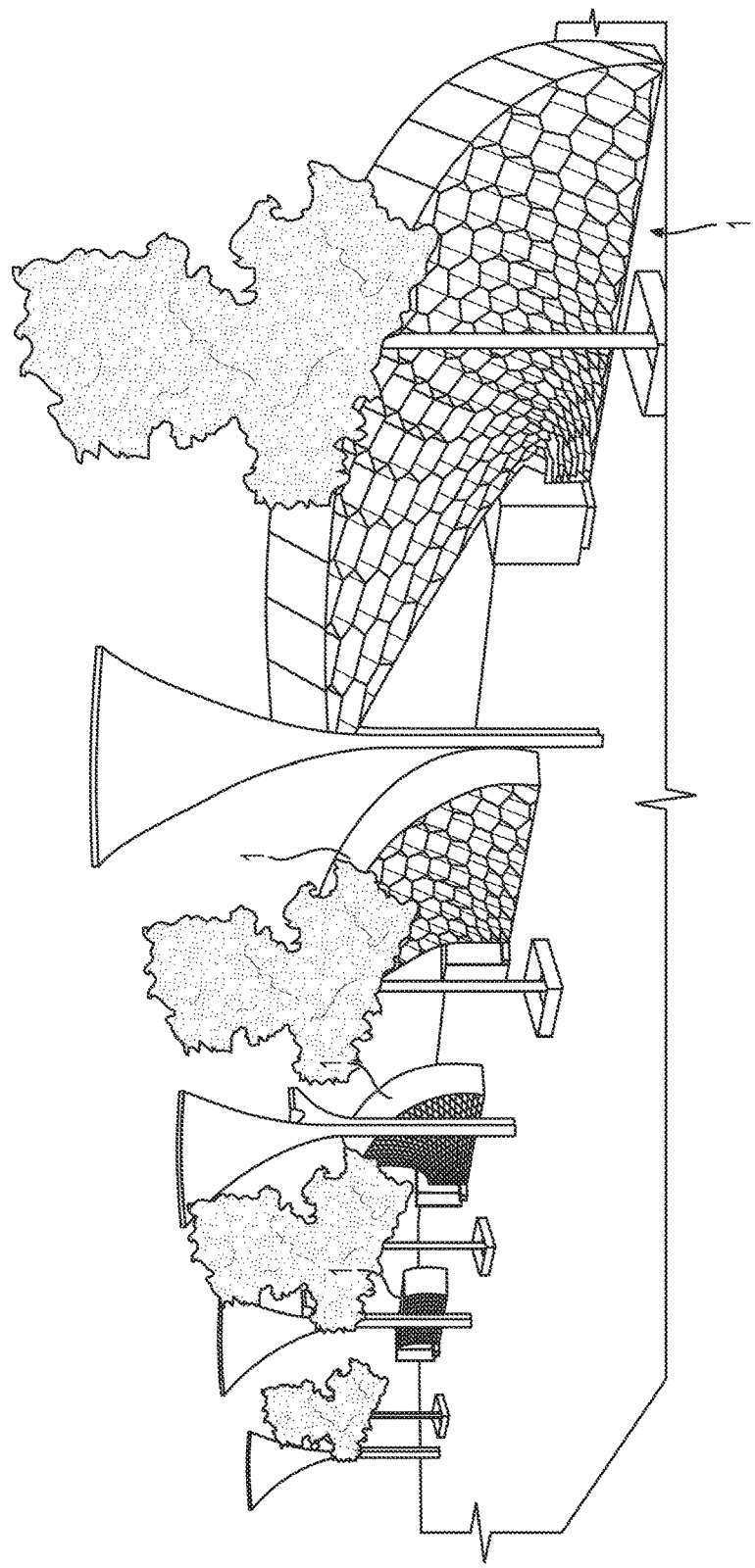
FIG. 2 shows a front view of a plurality of shade and shelter structure systems in a front view.

FIG. 2 shows a front view of a plurality of expandable shade and shelter systems in a public setting with environmental features such as trees and public space features such as paving stones or open area. The expandable shade and shelter systems 1 are in varying stages of expansion (e.g., deployment or collapsing). There is no particular limitation on the number of such shade and shelter systems that may be disposed in a public setting. FIG. 2 shows four such systems but this number may be expanded to accommodate any public space or private space in which temporary shelter from the elements such as shelter from sunlight is desired.

FIG. 3 shows a top view of an expandable shade and shelter system in an expanded configuration. Two main elements of the shade and shelter structure system include an expandable grid structure 2 and a vertically oriented support structure 3. The expandable grid structure 2 and the vertically oriented support structure 3 are connected or in contact through a connecting device 4 which permits attachment of the expandable grid structure 2 mechanically to the vertically oriented support structure 3. The expandable grid structure is also directly connected and anchored at an anchor point 5. The anchor point 5 may be a simple anchor point or more complex such as that shown in FIG. 3 in which the anchor point may be a separate architectural feature such as a post or other feature providing a secure and permanent anchoring point for the expandable grid structure. The expandable grid structure 2 is also preferably anchored at an apex portion as shown in FIG. 3. At point 6 the expandable grid structure may be attached at a bottom or top portion (not shown in FIG. 3) to an anchor point or substrate such as the ground.

The expandable grid structure includes a plurality of reversibly expandable cells 7. As shown in FIG. 3 the reversibly expandable cells are in different stages of expansion. Some cells towards the perimeter of the expandable grid structure may be truncated or in partial form. Other cells may be in a fully expanded form or may be in a partially contracted or collapsed form. A top surface of the expandable grid structure 8 connects the anchor point 6 with the vertically oriented support structure 3.

The reversibly expandable cells 7 of the expandable grid structure 2 of FIG. 3 are in the form of hexagons, each cell having three similarly sized sides. The cells may take other shapes or forms including triangular, square or rhombohedral containing 3, 4, 5, 7, 8, 9, 10 or 12 sides. In a preferred embodiment the reversibly expandable cells 7 are hexagons having 6 sides of equal length when the cell is in a fully expanded configuration. The cells may alternately have curved sides and represent, for example, looped areas of fabrics that are interwoven with one another. There is no particular restriction on the number of reversibly expandable cells that may comprise the expandable grid structure. Preferably, the expandable grid structure is two-dimensional with each reversibly expanding cell having a first side and a second side with each side representing an exterior surface of the expandable grid structure when in an expanded or collapsed form. A perimeter 9 follows the contours of the outer surfaces of the expanded grid structure that are not the exterior surfaces of the reversibly expandable cells. The perimeter may intersect certain cells such that the expandable grid structure includes partial cells at perimeter locations. In an alternate embodiment of the invention one or more portions of the perimeter such as the expandable second end may have a configuration other than a flat surface or a straight line. For example, the expandable second end 10 of the expandable grid structure shown in FIG. 3 may have a zig-zag-type structure in which the exterior-facing portion of the expandable grid structure represents the exterior shape of the cells in their complete form, e.g., no cells are truncated or split at the perimeter of the expandable grid structure.

The expandable shade and shelter structure system may be of varying dimensions so long as it remains functional for providing shelter and shade blocking to one or more individuals. A total length of the structure system from the anchoring point 6 to an anchored first end 5 may be from 1 to 5 meters, preferably 2 to 4 meters, 3 to 4 meters or about 2.5 meters. The architectural feature that may represent the anchored first end 5 may have a length or dimension that is from 10% to 1%, preferably 8% to 2%, preferably 6% to 4% or about 5% the total length from the first anchored end 5 and the anchoring point 6. The width of the structure system measured from the outermost surface of the expandable grid structure to an axis of the vertically oriented support structure 3 may be from 0.5 to 3 meters, preferably 1 to 2.5 meters, more preferably about 2 meters.

FIG. 4 shows an embodiment of the disclosure in which the expandable shade and shelter system is in a fully collapsed form. The vertically oriented support structure 3 is no longer connected to the expandable grid structure 2 which is in a completely collapsed form. In a collapsed form the expandable grid structure represents a rectangular cuboid and effectively functions as a sold bench space or tabletop space in public gathering places. The ratio for the width of the rectangular cuboid to the length of the rectangular cuboid is from 0.05:1, preferably 0.1:1, 0.15:1, 0.2:1, 0:25:1, 0.3:1, 0.35:1, 0.4:1 or 0.5:1. Preferably the rectangular cuboid has a width that comfortably accommodates a sitting position for one or more individuals. Alternately, the top surface 8 of the expandable grid structure when in a completely collapsed form may be used for other purposes such as a display space for vendors. The exposed top surface of the expandable grid structure in collapsed form may have a height that is greater than or less than the total height of the anchored first end and/or an architectural feature such as a post representing the anchored first end. For example, the anchored first end may include a cap or covering that extends above and covers at least a portion of the exposed top surface of the expandable grid structure in collapsed form. In the top view shown in FIG. 4 the expandable grid structure and vertically oriented support structure 3 are separated such that individuals may easily pass between the collapsed expandable grid structure 2 and the vertically oriented support structure 3. In this collapsed configuration there is sufficient room for children to play or individuals to freely meet in open sunlight.

Figure 5A:
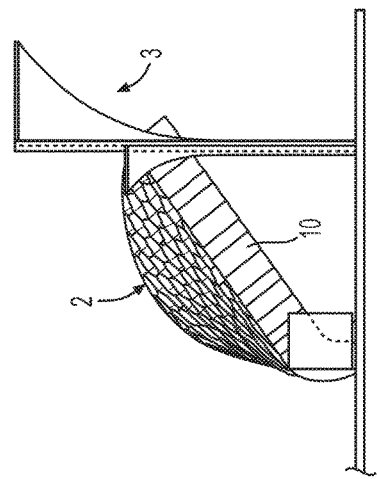
FIG. 5A shows an embodiment of the present disclosure providing a side view of a shade and shelter system in an expanded configuration.

FIG. 5A shows a side view of an embodiment of the present disclosure in which the expandable grid structure 2 is in a fully expanded or deployed form and connected to the vertically oriented support structure 3. The point of attachment of the expandable grid structure and the vertically oriented support structure is a connecting device which permits direct connection and temporary connection of one or more corners of the expandable grid structure to the vertically oriented support structure. The connecting device is sufficient to withstand environmental forces such as high winds and the like such that the expandable grid structure does not unintentionally become detached from the vertically oriented support structure 3. The expandable grid structure 2 shown in FIG. 5A includes a plurality of reversibly expandable cells 7 in various stages of expansion. Although some of the cells in the expandable grid structure are fully expanded and are clearly in the form of hexagons, other cells, for example those cells close to the anchoring point 5 or the surface formed by expanding the expandable second end 10 are only partially expanded and/or are truncated or separated into different sections.

The expandable grid structure may comprise a plurality of cells made of a variety of materials. Preferred materials include those which may withstand direct and extended exposure to direct sunlight and solar rays. In a preferred embodiment the reversibly expandable cells 7 are made from a metallic material. Connections between hexagons and connections between sides of hexagons are flexible and/or jointed and/or articulated to permit folding and collapse of the expandable grid structure. In different embodiments of the invention the reversibly expandable cells 7 may be open or closed thus providing a transparent, closed or non-transparent exterior and/or interior surface of the expandable grid structure when it is in an expanded configuration. In different embodiments different portions or certain sections of the expandable grid structure may contain cells that are completely end-capped (e.g., cells that are covered at the exterior exposed surfaces), and portions or sections which are open. Choosing a proportion of open and closed cells can affect the visual properties and privacy properties that are provided by the expandable grid structure.

Other materials include fabrics both woven and nonwoven and combinations of materials such as metals and fabrics. In a preferred embodiment of the invention the expandable cells are made from a lattice of metal wire or short metal segments without any side of the hexagonal cell comprising a solid flat surface of metal. One or more of such wired expandable cells may be covered or connected to a fabric or other material that serves the purpose of providing shading when the expandable grid structure is in an expandable configuration.

In other preferred embodiments of the invention one or more of the cells is made from flat surfaces of a synthetic material such as a thermoplastic or thermoset material. Particularly preferred materials include polyurethane and polyolefin materials that are compressible, expandable and bendable. When a synthetic material is used the expandable grid structure has a greater degree of flexibility and expansion thus permitting a greater degree of outward bending of the expandable grid structure from the axis that otherwise represents the axis of the rectangular cuboid when the expandable grid structure is in a collapsed form.

Figure 5B:
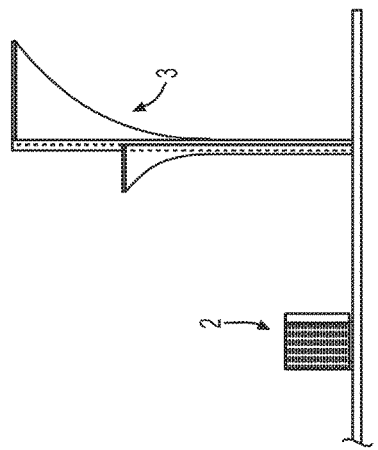
FIG. 5B shows an end view of an embodiment of the present disclosure in which a shade and shelter system is in an expanded configuration.

FIG. 5B shows an end view of the expandable shade and shelter system in a fully expanded configuration. The vertically oriented support structure 3 is in direct contact and connected to the expandable grid structure at a point representing a top location on an expandable second end 10. The vertically oriented structure may alternately be directly connected to an opposite end of the expandable second end and/or connected at both width ends thereof. The vertically oriented support structure 3 shown in FIG. 5B has architectural features including flares at different heights. A top flare or expansion of the vertically orientated support structure 3 serves an ornamental or utility purpose. Ornamentally the vertically oriented support structure is intended to more delicately blend with environmental surrounding features such as trees. Alternately, the flare may be three-dimensional such that one or more lighting elements is enclosed therein such that light is directed downwardly around the area of the expandable shade and shelter system or upwardly for decorative effect. A second flare is evident on the vertically oriented support structure 3 at a height lower than the height of the first flare. The second flare preferably is similar to the first flare but substantially smaller in size. For example, the second flare may have a total exposed surface when viewed from a top view of only 0.5:1 with respect to the first flare, preferably 0.1:1, 0.2:1, 0.3:1 or 0.4:1.

Figure 6A:
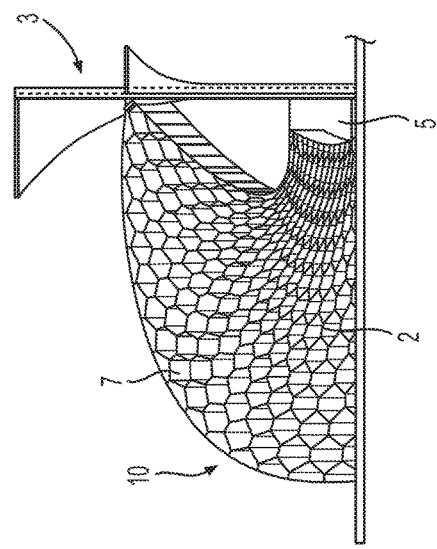
FIG. 6A shows a side view of an embodiment of the invention in which a shade and shelter system in a collapsed configuration.

FIG. 6A shows a side view of an embodiment of the expandable shade and shelter system in a completely collapsed form. In the side view the expandable grid structure is folded down and collapsed to form a rigid or semi-rigid structure capable of providing an architectural feature or a utility feature such as seating space. The expandable grid structure is no longer in direct contact with the vertically oriented structure 3. In its collapsed form the height of the expandable grid structure is preferably 0.2-2 meters, 0.5-1.5 meters, 1-1.15 meters or about 0.5 meters. The height at which the expandable grid structure is connected to the vertically oriented support structure 3 is from 1 to 3 meters, preferably from 1.5 to 2.5 meters, preferably about 2 meters. The total height the vertically oriented support structure is from 1 to 5 meters, preferably 2 to 4 meters, or about 3 meters.

In the rectangular cuboid form when in its collapsed configuration the expandable grid structure has a top surface 8 and expandable second end, an anchored first end 5, and an anchored bottom 11. These surfaces exposed or unexposed, represent the perimeter of the expandable grid structure when it is in a collapsed form. The outside surfaces, i.e., two expandable sides 12 that are formed when the expandable grid structure is collapsed may be flat or textured, ordinarily such sides are textured representing the mechanical features of the expandable grid structure which remain exposed in the collapsed form. Preferably, when collapsed, the expandable sides are only partially porous or transparent. Ordinarily the collapsed reversibly expandable cells are of insufficient width for a human hand to pass through. Of course, when the reversibly expandable cells 7 are capped or covered at the ends, no pass through is possible.

Figure 6B:
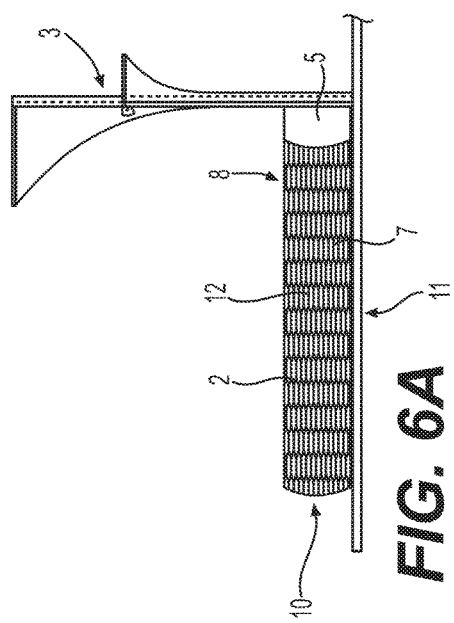
FIG. 6B shows an end view of an embodiment of the invention in which an expandable shade and shelter system is in a collapsed configuration.

FIG. 6B shows an end view of the expandable shade and shelter system in its fully collapsed or retracted form. The rectangular cuboid shape of the expandable grid structure is clearly evident as is its separation and lack of direct attachment thereof to the vertically oriented support structure 3.

FIG. 7 shows full deployment or expansion of the expandable shade and shelter system. An interior surface of the expandable grid structure 2 is shown as 2a. The stylized depiction of the expandable shade and shelter structure system shown in FIG. 7 provides shade to a target area 14. Although target area 14 is depicted as a rectangular area, the actual shaded area will vary depending on the configuration of the reversibly expanded cells, the position of the sun and the structure of the expandable grid structure 2. Preferably the shaded area 14 is sufficient for one or more individuals to seek complete or partial shade from direct sunlight or solar rays. The outer surface that is formed by the expandable second end when the expandable grid structure 2 is in an expanded configuration is shown as flat and smoothly contoured in FIG. 7. However, this edge may alternately be textured differently or may represent a pattern that is directly related to the outside exposed surfaces of the last hexagonal cells of the expandable grid structure.

Figure 8A:
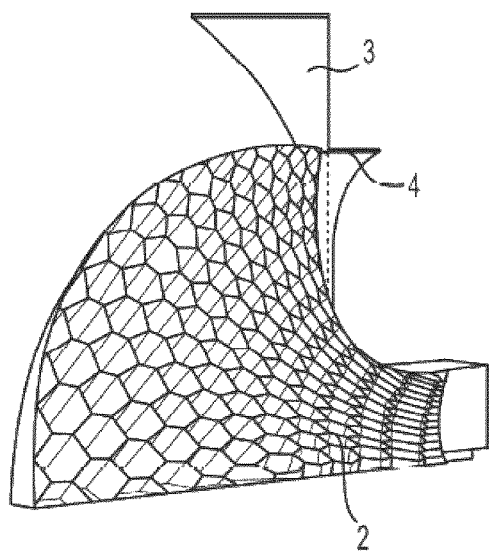
FIG. 8A shows an embodiment of the present disclosure in which an expandable shade and shelter system is in an expanded configuration in which a grid of hexagonal cells is connected to a vertically oriented support structure.
Figure 8B:
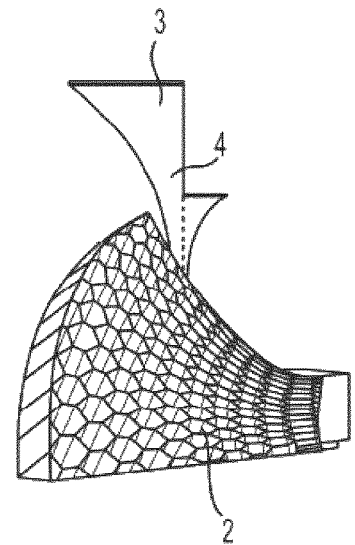
FIG. 8B shows an embodiment of the present disclosure in which an expandable shade and shelter system is in a partially collapsed form in which a connecting device has been disconnected from a vertically oriented support structure.
Figure 8C:
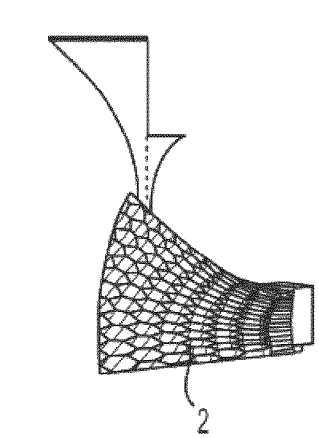
FIG. 8C shows an embodiment of the present disclosure in which an expandable shade and shelter system has been disconnected from a vertically oriented support structure and is in a partially collapsed form.

Importantly, the expandable grid structure and the expandable shade and shelter system are ones which may be expanded and collapsed as needed. In an expanded or deployed configuration the shade and shelter system provides protection from the elements, especially protection from direct exposure to sunlight or solar rays. FIG. 8A shows the expandable grid structure 2 in a fully expanded configuration connected with the vertically oriented support structure at the connecting device 4. FIG. 8B describes a first step towards collapsing of the expandable shade and shelter system whereby the expandable grid structure 2 has been disconnected from the vertically oriented support structure and is no longer connected at a connecting device 4. FIG. 8C shows further collapse and retraction of the expandable grid structure 2.

Figure 8D:
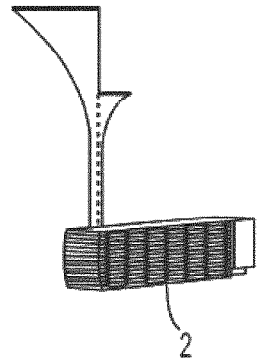
FIG. 8D shows an embodiment of the invention in which an expandable grid of hexagonal cells has been disconnected from a vertically oriented support structure and is in a stacked or collapsed configuration.

Ordinarily, the expandable grid structure easily retracts and lays down into a flat rectangular cuboid. However, depending on the material of construction, a period of time may, in some embodiments, be necessary in order to achieve full collapse and flat placement of the expandable grid structure. This is most evident when materials such as porous open cell or closed cell polyurethane materials are used as the material construction for the walls of the reversibly expandable cells or perimeters, or caps thereof. Because the expandable grid structure is anchored to a substrate such as the ground, retraction or collapsing of the expandable grid structure is easy to monitor and guide. Disconnection of the expandable grid structure 2 from the connecting device 4 which is fitted onto the vertically oriented support structure generally permits immediate and gravity-led separation and settling of the expandable grid structure to form a rectangular cuboid. FIG. 8D shows the expandable shade and shelter system in a completely collapsed or retracted form such that the expandable grid structure is now in a rectangular cuboid form with no contact and no connection to the vertically oriented support structure 3.

Steps for the collapse and/or retraction of the expandable shade and shelter system are shown in a top view in FIG. 9. FIG. 9A shows embodiments in which the expandable shade and shelter system is fully deployed such that the expandable grid structure 2 is directly connected to the vertically oriented support structure and is concurrently anchored at an anchored first end and anchored bottom 11. Detachment of the expandable grid structure 2 from the vertically oriented support structure 3 is shown in FIG. 9B. In this figure the expandable grid structure 2 is no longer connected or in direct contact with the vertically oriented support structure. Further collapse and retraction is shown in FIG. 9C where the expandable grid structure 2 is further distanced from the vertically oriented support structure 3. The anchored first end 5 and the anchored bottom 11 do not change their relative position with respect to the vertically oriented support structure through any stage of expansion or collapse of the expandable shade and shelter structure system. Full collapse or retraction of the expandable grid structure is shown in FIG. 9D. The top surface of the rectangular cuboid 8 is shown with a top portion of the first anchored end 5 and the expandable second end 10.

Figure 10A:
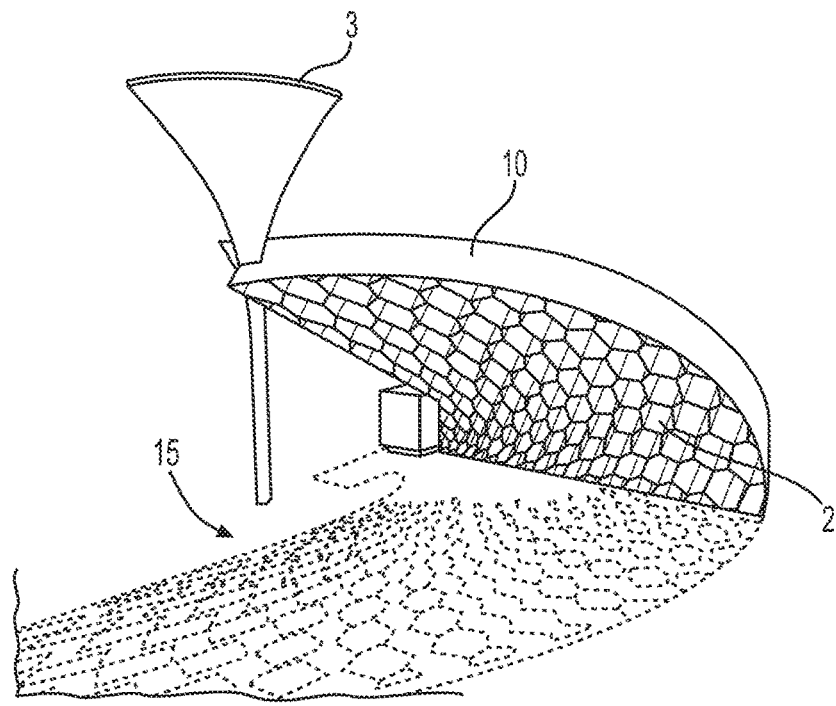
FIG. 10A shows an elevation of an expandable shade and shelter system in an expanded configuration providing shade from sunlight.
Figure 10B:
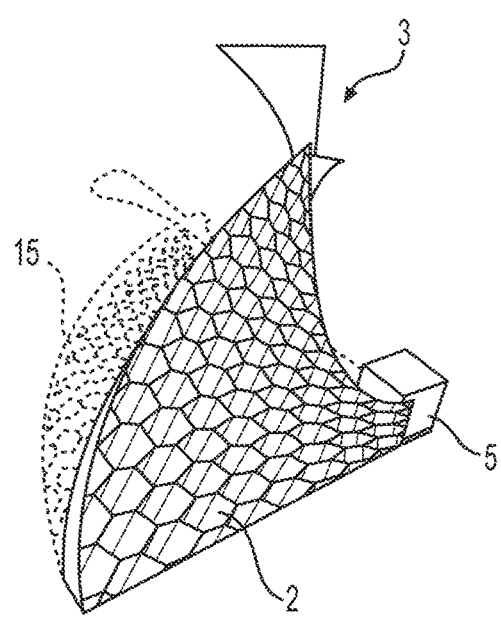
FIG. 10B shows a top view elevation of an embodiment of an expandable shade and shelter structure system providing partial shade from sunlight.

FIGS. 10-11 show stylized depictions of the embodiments of the expandable shade and shelter system when deployed, expanded or collapsed in a public space according to different elevations and degrees of shading. FIG. 10A describes the shade and shelter system in an expanded configuration early in the morning or early in the evening or at another time with reversibly expandable cells oriented for partial blockage of direct sunlight or solar rays. The resulting shaded area 15 is partial with portions completely shaded and other portions unshaded. FIG. 10B similarly shows deployment or expansion of the expandable shade and shelter system such that partial shade 15 is obtained. The degree of shading may change depending on the orientation of the sun and the degree of expansion or deployment of the expandable grid structure.

In a preferred embodiment of the invention the expandable grid structure may be connected to the vertically oriented support structure at a connecting point 4 that is variable in height. By varying the height of the connecting device 4 the orientation of the expandable grid structure to sunlight or solar rays is changed. In this way the degree of shading in area 15 may be customized or adapted to the tastes and needs of one or more individuals seeking shelter therefrom.

Figure 11A:
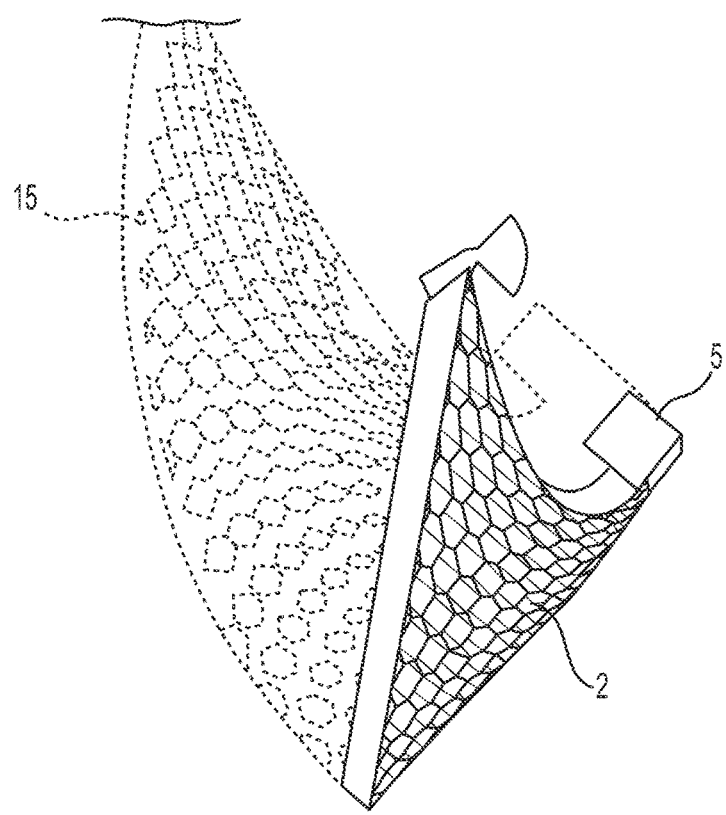
FIG. 11A shows an embodiment of the present disclosure in which an expandable shade and shelter system is in an expanded configuration providing complete shade from sunlight.

FIG. 11A describes an embodiment of the expandable shade and shelter system providing a greater degree of shade. By altering the orientation of the expandable grid structure and/or by expanding during particular periods of the day or particular conditions of sun exposure, the degree of shading 15 may be changed. In this manner the total exposed shaded area may increase or decrease depending on factors including orientation of the sun, structure of the reversibly expandable cells, and degree of extension (height) of the expandable grid structure 2.

Figure 11B:
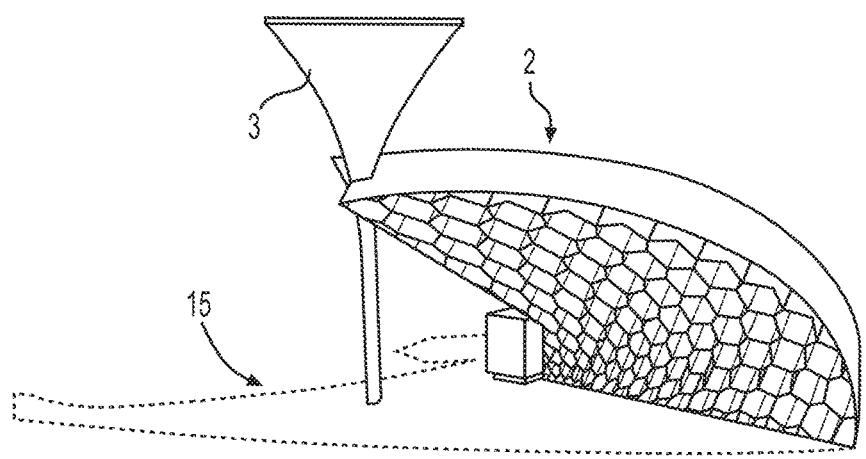
FIG. 11B shows an embodiment of the present disclosure in which an expandable shade and shelter system is in an expanded configuration providing complete shade from sunlight.

FIG. 11B shows an embodiment in which the expandable shade and shelter system provides complete shading such that an area 15 is completely free of direct exposure to sunlight or solar rays. Of course, the area directly beneath the expandable grid structure 2 may further be sheltered or protected from other elements such as precipitation or high winds.

Obviously, numerous modifications and variations of the present invention are possible in light of the above teachings. It is therefore to be understood that within the scope of the appended claims, the invention may be practiced otherwise than as specifically described herein.

The invention claimed is:

1. An expandable shade and shelter system, comprising:
   an expandable grid structure comprising a plurality of reversibly expandable cells surrounded by a perimeter, wherein the expandable grid structure is configured to collapse to a rectangular cuboid in which the perimeter has a top surface, an anchored bottom anchored to the ground, an anchored first end anchored to an anchor point, an expandable second end, and two expandable sides, wherein the expandable cells are disposed in a two-dimensional grid within the perimeter,
   a connecting device fixed at one or both corners of the top surface and/or the expandable second end of the expandable grid structure, proximal to a location where the top surface joins the expandable second end,
   a vertically oriented support structure having a top end and a bottom end, wherein the top end is configured to connect to the connecting device and the bottom end is anchored to the ground, wherein the vertically oriented support structure is disposed proximal to the anchored first end within the length of the top surface of the expandable grid structure,
   wherein the expandable grid structure is configured to expand upwardly from the expandable second end and inwardly towards the top end of the vertically oriented support structure, while the anchored first end remains anchored to the anchor point, to thereby connect the connecting device to the top end of the vertically oriented support structure to form a three dimensional shelter.

2. The expandable shade and shelter system of claim 1, wherein one or more of the reversibly expandable cells is in a form of a hexagon having six sides and two ends corresponding to the two expandable sides, wherein the two ends of each hexagon are covered.

3. The expandable shade and shelter system of claim 1, wherein the reversibly expandable cells have open ends corresponding to the two expandable sides.

4. The expandable shade and shelter system of claim 1, wherein the reversibly expandable cells comprise sides made of a thermoplastic polymer material.

5. The expandable shade and shelter system of claim 4, wherein the thermoplastic polymer is a polyurethane that is compressible and flexible.

6. The expandable shade and shelter system of claim 1, wherein the expandable grid structure comprises a plurality of reversibly expandable cells that have open ends corresponding with the two expandable sides and a plurality of reversibly expandable cells having covered ends corresponding to the two expandable sides.

7. The expandable shade and shelter system of claim 1, wherein the vertically oriented support structure is connected to the expandable grid structure at a single point of the expandable grid structure.

8. The expandable shade and shelter system of claim 1, wherein the top surface of the expandable grid structure is flat when collapsed to the rectangular cuboid.

9. The expandable shade and shelter system of claim 1, wherein the vertically oriented support structure extends beyond the two expandable sides of the expandable grid structure when in an expanded configuration.

10. The expandable shade and shelter system of claim 1, wherein the vertically oriented support structure has multiple connecting points at different heights.

11. The expandable shade and shelter system of claim 10, wherein the connecting device in the expandable grid structure is connected to one of the multiple connecting points in the vertically oriented support structure.

* * * * *